United States Patent Office 3,743,684
Patented July 3, 1973

3,743,684
CATALYST, CATALYST PREPARATION METHOD, AND PROCESS FOR CATALYTIC HYDROTREATING UNSATURATED HYDROCARBONS
Marvin M. Johnson and Donald C. Tabler, Bartlesville, Okla., assignors to Phillips Petroleum Company, Bartlesville, Okla.
No Drawing. Filed Jan. 21, 1971, Ser. No. 108,613
Int. Cl. C07c 11/00
U.S. Cl. 260—681.5 R                    4 Claims

ABSTRACT OF THE DISCLOSURE

A method for hydrotreating unsaturated hydrocarbon feedstreams containing monoolefins, diolefins, or acetylenes by contacting the feedstream with an iron-containing catalyst; the iron-containing hydrotreating catalyst; and a method for preparing the aforementioned hydrotreating catalyst.

---

This invention relates to a method of preparing an iron-containing catalyst. In another aspect, this invention relates to an iron-containing hydrotreating catalyst. In yet another aspect, this invention relates to a method of hydrotreating unsaturated hydrocarbon feedstreams containing monoolefins, diolefins, or acetylenes by contacting said feedstreams with an iron-containing catalyst. In a more specific aspect, this invention relates to the catalytic process for the selective hydrogenation of acetylenic impurities contained in a diolefin concentrate.

A number of industrial chemical applications exist in which it is necessary to hydrogenate one or more members of an organic mixture without significantly hydrogenating one or more other hydrogenatable members of that mixture. Similarly, it is frequently necessary to only partially hydrogenate a material which is capable of being hydrogenated to more than one level of saturation. Such operations have frequently been carried out in the presence of a variety of catalysts known in the art. However, prior art catalyst systems seldom have exhibited the desired degree of activity, selectivity, convenience, or economy for satisfactory operation. Diolefin-containing mixtures, for example, obtained in industrial processes usually comprise a variety of hydrocarbons other than the diolefins, and separation of the latter in a form suitable for use in the preparation of synthetic rubber has proven difficult. For instance, cracked oil-gas, which is a well-known source of diolefins, usually compirses paraffinic hydrocarbons ranging from methane to hexane; olefins such as ethylene, propylene, butylene, amylene, and hexene; diolefins such as allene, butadiene-1,3-methylallene, isoprene, and piperylene; and a small but appreciable amount of acetylenic hydrocarbons sch as acetylene, methacetylene, ethylacetylene, and vinylacetaylene, and the like.

Selective hydrogenation of acetylene and/or acetylenic compounds in the presence of olefins is a desirable process for reducing the acetylenic content of olefinic gases obtained from processes such as thermal or catalytic cracking of hydrocarbons. Many catalysts have been developed to selectively hydrogenate acetylene in the presence of olefin to olefinic compounds. Generally, the catalysts are too active and thereby hydrogenate the acetylene to paraffinic compounds and additionally, hydrogenate some olefins to paraffinic compounds. Other catalysts which have been developed are more selective yet not as active. They convert the acetylenic compounds to olefinic compounds without converting a susbtantial portion of the olefinic compounds to paraffinic compounds; however, the conversion is relatively small. Many of the known catalysts are also difficult to remove form the hydrogenated products, thus creating further impurities problems.

It is an object of this invention to provide an improved, economical, hydrogenation catalyst which is easily separable from hydrogenated product through settling or filtration means. It is another object of this invention to provide a catalytic method for selectively hydrogenating impurities in diolefin concentrate. A further object of this invention is to provide a method of preparing an iron-containing catalyst. Other aspects and objects of this invention will hereinafter appear in the examples and claims included hereinbelow.

In accordance with this invention, a catalyst system and process has now been found which is not only active for hydrogenation but which also shows a very high degree of selectivity. Further, because the specific catalyst system is a suspendable solid material, it can be conveniently separated from the reaction mixture and recycled. Additionally, the nature of the catalyst, including its activity, selectivity, and ease of handling, all combine to provide an important flexibility to a hydrogenation process making it convenient to choose and maintain conditions for optimum operations with any given situation.

Accordingly, olefinic hydrocarbon-containing feedstocks are selectively hydrogenated in the liquid phase in the presence of a finely divided solid iron-containing catalyst formed by admixing a solution of a ferric halide etherate complex with an organoaluminum compound. The selectivity of the hydrogenation can be increased further by the presence of a reaction modifier such as CO. The solid iron-containing catalyst can be readily separated from the reaction mixture and recycled.

The formation of the catalyst of the present invention requires a solution of a ferric halide etherate complex. Such an etherate solution can be prepared using any convenient and siutable procedure. For example, a ferric chloride, bromide, iodide, or fluoride, preferably a ferric chloide, is contacted with a sutiable ether compound in an inert solvent such as toluene, benzene, cyclohexane, heptane, and the like. Suitable ether compounds are diethyl ether, methylethyl ether, isopropyl ether, dimethyl ether, tetrahydrofuran, dibutyl carbitol, and the like. Chloroethers, such as 2,2'-dichlorodiethyl ether, can also be used In general, any ether, diether, or triether which will react with ferric halide to form a hydrocarbon-soluble ferric halide ethereate complex can be used. It is preferred that the etherate not only be soluble, but that it also be present in substantial concentration. Consequently, for best results, the specific iron compound, ether compound, and solvent should be chosen so as to provide a relatively high concentration of the etherate in the final etherate solution. It is presently preferred that the etherate solution be present in concentrations at or near saturation and that the concentration, if possible, be at least about 0.5 molar, more preferably 1 molar, and still more preferably about 3 molar, in respect to the iron. It has been found that such etherate have somewhat greater solubility in aromatic solvents than in paraffinc solvents.

The contact of the ferric halide with the ether in presence of a diluent results in an exothermic reaction and can require some cooling depending upon the amounts being contacted. However, the contact can be carried out over a broad range of temperature such as, for example, 50–150° F. Etherate formation at room temperature is ordinarily satisfactory. Approximately equimolar amounts of ferric halide and ether are used although, as a practical matter, an excess of the ether is advisable. For example, about 1.2–1.5 moles of ether per mole of ferric halide generally give satisfactory results. Higher ratios are not damaging although ratios lower than 1.0 will, of course, not react with and take advantage of all of the iron in the mixture.

The other reactant in the reaction to prepare the catalyst of the present invention is an organoaluminum compound of the formula $R_nAlX_{3-n}$ wherein R is an alkyl radical having from 1 to 12 carbon atoms per radical; $n$ is either 1, 2, or 3; and X is chlorine, bromine, or fluorine. These can be compounds such as trihydrocarbylaluminum compounds or hydrocarbylaluminum chlorides, bromides, iodides, or fluorides, preferably chlorides. Some examples of these are trimethylaluminum, triethylaluminum, diethylaluminum chloride, ethylaluminum dichloride, tributylaluminum, dibutylaluminum bromide, and the like, and mixtures thereof including mixtures referred to as methylaluminum sesquichlorides and the like. The organoaluminum compound can, for convenience, be in solution using solvents similar to those suitable for the etherate complex.

The catalyst of the present invention is produced in an exothermic chemical reaction in which the etherate solution, generally a dark brown solution, is reduced by contact with a suitable organoaluminum compound to form a mixture containing a fine dispersion of black solids. It is ordinarily preferred to add the etherate solution to the organoaluminum compound or to a solution of the organoaluminum compound. If a solution of the organoaluminum compound is used, the amount of solvent used should not be so excessive that it significantly dilutes the catalyst preparation solution. This reaction can be carried out over a broad temperature range such as, for example, from about −100° F. to about 150° F., preferably 30–100° F.

The ratio of aluminum compound to iron compound in this catalyst preparation reaction will ordinarily be such that the Al:Fe atomic ratio will vary from about 1:1 to about 10:1, preferably from about 1:1 to about 3:1. Still higher Al:Fe ratios can be used, if desired, but ratios substantially lower than about 1:1 are less desirable. It has been found that the optimum ratios of aluminum to iron in this reaction depend somewhat upon the concentration of the ferric halide etherate complex in the reacting solution. For example, if the concentration is about 0.5 molar in respect to the iron, a 3:1 atomic ratio of aluminum to iron is frequently more satisfactory than a 1:1 ratio. However, if concentrations of about 3 molar are used, a 1:1 aluminum:iron atomic ratio is very effective.

The contact of the iron complex and the aluminum compound is preferably carried out with agitation. The reaction is rapid and the resulting dispersion can be used directly in a selective hydrogenation process. For convenience, it can be further diluted with more solvent, and then contacted with the feed in a reaction zone which has been substantially purged of such catalyst poisons as air, water, or other oxygen-containing compounds.

The present inventive process includes a method of hydrotreating unsaturated hydrocarbon feedstreams containing monoolefins, diolefins, or acetylenes by contacting said feedstreams with an iron-containing catalyst. Our inventive process is particularly effective for the hydrotreating of hydrocarbon feeds containing acetylenic or diolefinic impurities. Thus, for example, the catalyst and process can be used for selectively hydrogenating acetylenic compounds such as might be found in butadiene or butene streams. Similarly, the process is applicable, under more severe conditions, for selectively hydrotreating monolefinic streams containing minor amounts of diene impurities, particularly conjugated diolefins. The olefinic feedstocks can be diluted with non-hydrogenatable or inert diluents. Olefinic refinery streams can be used as feedstocks. Some specific examples of feedstocks which can be hydrotreated are 1,3-butadiene, 1,3-pentadiene, isoprene, butene-2, pentene-1, heptene-2, octene-1, and the like, and mixtures thereof. Essentially, any olefinic hydrocarbon feed which can be conveniently maintained in the liquid state can be hydrotreated by the process of the present invention.

The hydrotreating process of the present invention can be carried out at temperatures in the range of from about 100 to about 700° F., preferably 200–500° F. The pressure within the reaction zone can vary from 0 to about 2000 p.s.i.g. but will be sufficient to maintain the feedstream and catalyst in liquid phase while in the reaction zone. The process can be carried out either continuously or batchwise, and any convenient contacting apparatus can be used. Hydrogen can be present in the reaction zone in concentrations ranging from the minimum amount required to react with all of the components to be hydrogenated to amounts greatly in excess of this value. Frequently, the hydrogen is present in amounts ranging from about 0.1 to about 5 moles of hydrogen per mole of total olefin present.

The selectivity of the process and catalyst can be further improved by incorporating carbon monoxide or other reaction modifiers in the reaction zone. This is conveniently accomplished by blending the modifier with the hydrogen in amounts which can range from about 0.02 to 1 mole percent of the hydrogen. Other modifiers which can be used include lower carbonyl compounds such as aldehydes, ketones, and acids. Some specific examples are acetaldehyde, formic acid, dimethylketone, and the like, and mixtures thereof. If the hydrocarbon feedstreams already contain some small quantities of such carbonyl compounds, the level of the added catalyst selectivity modifiers can be correspondingly reduced. Further, it has been found that, when aromatic solvents are present in the reaction zone, somewhat lower levels of modifier can be used.

The hydrotreating of diolefinic feedstreams to destroy such acetylenic compounds as vinylacetylene and the like is frequently very effective at temperatures of 150–400° F. and in the presence of catalyst modifiers such as carbon monoxide. In such a process, the acetylenic impurities can be substantially reduced or eliminated while experiencing little or no loss of conjugated dienes, such as butadiene or isoprene, which may be present in the reaction mixture. On the other hand, when it is desired to remove minor amounts of diolefinic impurities, particularly conjugated diolefins, in the presence of monoolefins, preferred conditions for such an operation include temperatures of about 150–400° F. and the essential absence of catalyst modifiers such as carbon monoxide. Operation in this manner can be satisfactory for eliminating the butadiene content in a stream of butenes. At temperatures above about 500° F. the hydrogenation process is much less selective unless substantial amounts of catalyst modifiers are present.

The quantity of catalyst present in the reaction zone can vary over a wide range and can be an important control over the rate of reaction. Depending upon the specific feed and the desired rate of reaction, the catalyst can be present in the reaction zone in amounts ranging from about 0.1 millimole to about 1 mole of Fe per mole of olefinic feed. The residence time can similarly vary widely. Typical reaction times can vary from 1 second to about 90 minutes, preferably 1–15 minutes.

At the completion of the reaction period or after the reaction mixture leaves the reaction zone, the reaction mixture can be subjected to separation operations and to recovery of desired product using any convenient and suitable means. The catalyst, being a finely divided but separable solid, can be recycled to the reaction zone. In one mode of operation, for example, the reactor effluent can be separated using filtration and distillation techniques to isolate and recover the catalyst for recycling to the reaction zone. In still another mode of operation, the desired hydrotreated product can be continuously distilled and removed from the reaction zone while fresh feed is continuously introduced into the reaction zone. Fresh catalyst can also be introduced in this manner while a small stream containing spent catalyst can be continuously rejected from the reaction zone. The catalyst of the invention can thus be recycled and reused for long periods up until the point it is inactivated or destroyed by catalyst poisons in the feed or system.

The following examples and tables illustrate a method for preparing catalysts of our invention as well as a hydrotreating process for unsaturated hydrocarbon feedstreams utilizing the prepared catalyst.

EXAMPLE I

An iron-containing selective hydrogenation catalyst was prepared. In a first step, a benzene solution of a ferric chloride-ether complex was made by combining 16.2 g. (0.1 mole) of anhydrous $FeCl_3$ with 50 ml. benzene and 15.8 ml. (0.15 mole) diethyl ether at room temperature and in an inert helium atmosphere. Some warming of the mixture was noted and a dark red-brown solution, containing negligible amounts of powdery insoluble material, was obtained. Additional benzene, sufficient to bring the total volume up to 200 ml. was added and the solution was found to be 0.5 molar in iron.

The catalyst preparation was completed in a second step, just prior to use in a hydrotreating reaction, by adding, with agitation, 2.0 ml. of the above-described solution to 3.0 ml. of a 1 molar benzene solution of triethylaluminum (3:1 Al:Fe ratio). This addition was also carried out in a dry inert atmosphere. A warming of the mixture was observed and a dispersion of a fine black granular solid formed which settled in a few minutes but which was readily redispersed by agitation.

EXAMPLE II

The catalyst prepared in Example I was used to selectively hydrogenate acetylenic compounds in a refinery $C_4$ butadiene concentrate.

In to a dry, nitrogen-purged 1-liter autoclave was charged 350 ml. isooctane followed by 0.001 mole of the iron catalyst prepared in Example I. The vapor space of the reactor was then purged with hydrogen. The hydrogen contained 0.1 mole percent CO.

About 50 g. of the butadiene concentrate (pretreated to remove moisture and most oxygen-containing impurities) was added and the pressure of the system was adjusted to 300 p.s.i.g. with this hydrogen gas. The reactor and contents were then warmed from room temperature to 250° F., over about a 15–30 minute period. When the 250° F. temperature was reached, the mixture was sampled. The reaction mixture was allowed to remain at 250° F. for another 60 minutes at which time the contents were sampled again.

Several additional test runs were carried out under essentially identical conditions except that other catalyst preparations were used. These preparations were essentially identical to that of Example I except that either tetrahydrofuran or dibutyl carbitol was used instead of the diethyl ether.

The chromatographic analysis results of these runs are shown in Table I following:

TABLE I.—HYDROTREATMENT OF $C_4$ BUTADIENE CONCENTRATE

| | Run Number | | | | | |
|---|---|---|---|---|---|---|
| | [1]1 | | 2 | | 3 | |
| | Tetrahydrofuran | | Diethyl ether | | Dibutyl carbitol | |
| Complexing ether time at 250° F. | Initial[2] | 60 | Initial[2] | 60 | Initial[2] | 60 |
| Composition, weight percent (feed): | | | | | | |
| n-Butane, 34.89 | 32.90 | 33.21 | 31.45 | 33.92 | 35.80 | 31.32 |
| Butene-1, 11.43 | 13.53 | 14.51 | 11.53 | 13.17 | 14.08 | 13.94 |
| t-Butene-2, 3.43 | 3.68 | 3.91 | 4.32 | 4.99 | 3.77 | 4.06 |
| c-Butene-2, 2.99 | 2.36 | 2.93 | 3.22 | 3.95 | 2.86 | 2.55 |
| 1,3-butadiene, 46.26 | 47.25 | 45.40 | 49.30 | 43.95 | 43.14 | 47.98 |
| 1,2-butadiene, 0.29 | 0.14 | 0.04 | 0.18 | 0.02 | 0.14 | 0.13 |
| Butyne-1, 0.10 | 0.03 | 0.0 | 0.0 | 0.0 | 0.05 | 0.01 |
| Vinylacetylene, 0.60 | 0.10 | 0.0 | 0.0 | 0.0 | 0.16 | 0.01 |

[1] Cyclohexane used as reaction solvent instead of isooctane.
[2] Although this represents essentially no time at 250° F., opportunity for reaction existed during warm-up from room temperature to 250° F.

The data in Table I clearly show the activity of the catalyst of the present invention for the hydrogenation of acetylenic impurities, as well as its selectivity in that there was little or no discernible loss of butadiene. The activity is made clearly evident by the low butyne-1 and vinylacetylene content found in the mixture after the few minutes required for the mixture to reach 250° F. The selectivity, on the other hand, is readily apparent from the results of the analyses taken after 60 minutes at 250° F. These analyses show that, even after such a severely long reaction time, no substantial butadiene, within the precision of the analytical method, was lost.

EXAMPLE III

The cyclic reuse of the readily separable catalyst system of the invention is demonstrated hereinbelow.

In a manner similar to that of Example II, the autoclave was charged with 3.0 ml. of a 1.0 molar benzene solution of triethylaluminum, 2.0 ml. of a 0.5 molar etherate solution prepared with a 1.2:1 mole ratio of tetrahydrofuran to iron and 350 ml. dry toluene. The vapor space was purged with hydrogen (containing 0.05 mole percent CO) and about 50 g. of a refinery butadiene concentrate was added. The pressure was brought up to 300 p.s.i.g. with the hydrogen and the temperature was brought up to 250° F. over a 15–30 minute period.

A sample was taken at this time and the reaction mixture was then cooled to just below the boiling point of toluene. The $C_4$ products were allowed to vent, and a fresh 50 g. portion of butadiene concentrate was added, the pressure again increased to 300 p.s.i.g., and the temperature again increased to 250° F. again over a 15–20 minute period. Thus, another charge of butadiene concentrate was contacted, under reaction conditions, with the previously used charge of catalyst.

This same sequence was repeated several times to selectively hydrogenate several more batches using the same catalyst charge at the same catalyst-to-feed ratio of about 0.001 mole Fe per mole of $C_4$ hydrocarbon. The results of these runs are shown in the following Table II.

TABLE II

| Run number | [1]1 | [1]2 | [1]3 | [2]4 | [2]5 | [1]6 | [1]7 | [1]8 |
|---|---|---|---|---|---|---|---|---|
| Composition, weight percent (feed): | | | | | | | | |
| Butane, 30.79 | 32.09 | 30.77 | 27.01 | 27.74 | 28.74 | 27.85 | 28.09 | 27.86 |
| Butene-1, 11.23 | 15.42 | 14.52 | 13.17 | 14.58 | 13.96 | 13.00 | 13.77 | 11.78 |
| t-Butene-2, 4.74 | 5.08 | 5.86 | 4.89 | 4.65 | 5.36 | 4.53 | 4.10 | 4.61 |
| c-Butene-2, 2.30 | 2.71 | 2.81 | 2.60 | 2.77 | 3.29 | 2.85 | 2.71 | 2.79 |
| 1,3-butadiene, 50.33 | 44.64 | 45.88 | 52.09 | 50.08 | 48.43 | 51.49 | 51.11 | 52.53 |
| 1,2-butadiene, 0.20 | 0.07 | 0.07 | 0.16 | 0.16 | 0.20 | 0.18 | 0.12 | 0.24 |
| 1-butyne, 0.08 | 0.0 | 0.0 | 0.02 | t | 0.0 | 0.02 | 0.02 | 0.03 |
| Vinylacetylene, 0.33 | 0.0 | 0.0 | 0.06 | 0.02 | 0.01 | 0.07 | 0.08 | 0.15 |

[1] Sampled for anlaysis as soon as 250° F. was reached.
[2] Sampled for analysis after 15 minutes at 250° F.

The data in the table above illustrate the ease with which the catalyst can be separated from the product, thus permitting the catalyst to be used and reused as long as it remains active. It need not be destroyed, prematurely and unnecessarily, in the mere process of recovering the product. The data also show that the activity and the selectivity of the catalyst are long lived.

The accurate measurement of the 1,3-butadiene loss in these runs was hampered by the presence of the large amounts of butane and butenes in the feed which made sampling and analyses techniques difficult because of the wide boiling range of the mixture. Hence, to more closely measure the rate of 1,3-butadiene loss, a simpler synthetic feed containing 40 wt. percent isobutane, 40.9 wt. percent 1,3-butadiene, and 2.0 wt. percent 1-butyne was prepared and tested with this catalyst system at a catalyst charge corresponding to 0.001 mole Fe/mole $C_4$. At 250° F. and at 300 p.s.i.g. hydrogen pressure, the rate of 1-butyne hydrogenation was such that about 96% of this contaminant was destroyed before 1 weight percent of 1,3-butadiene was lost. Because 1-butyne is more difficult to hydrogenate than vinylacetylene, the selectivity with respect to vinylacetylene is even better.

EXAMPLE IV

In a manner similar to that of Example II, a refinery $C_4$ butadiene concentrate was hydrotreated with the catalyst of this invention but at temperatures of up to 325° F.

The reactor was charged with 2 ml. 0.5 molar $FeCl_3$-tetrahydrofuran complex, 3 ml. of 1.0 molar triethylaluminum, 300 ml. dry cyclohexane, and 52 g. of a $C_4$ butadiene concentrate. The reactor was then flushed and pressured with hydrogen, containing 0.5 mole percent CO, to a pressure of 500 p.s.i.g. and the reactor was heated from room temperature to 325° F. in 80 minutes.

The reactor was cooled and the $C_4$ hydrocarbons were flashed from the reactor, collected, sampled, and analyzed by gas-liquid chromatography. The results of the analyses are shown in the following Table III.

TABLE III.—HYDROTREATMENT OF $C_4$ BUTADIENE CONCENTRATE AT 325° F.

| Composition, weight percent | Feed | Product |
| --- | --- | --- |
| n-Butane | 35.76 | 35.92 |
| Butene-1 | 13.60 | 14.73 |
| t-Butene-2 | 3.86 | 2.69 |
| c-Butene-2 | 2.34 | 2.90 |
| 1,3-butadiene | 43.54 | 43.66 |
| 1,2-butadiene | 0.23 | 0.10 |
| Butyne-1 | 0.10 | 0.00 |
| Vinylacetylene | 0.55 | 0.00 |

The analyses show that the selective hydrogen treatment destroyed all the butyne-1 and vinylacetylene, and about half the 1,2-butadiene, without apparent hydrogenation of the 1,3-butadiene or the butenes.

EXAMPLE V

A 1,3-pentadiene feed was hydrogenated in the absence of a catalyst modifier to pentenes and to pentane.

The catalyst was prepared by mixing 0.57 g. anhydrous $FeCl_3$ with 17 ml. benzene and 1.5 ml. tetrahydrofuran producing a solution about 0.19 molar in iron and containing about 5 moles of ether per mole of iron. A 1.5 ml. quantity of this solution was then reacted, at room temperature, with 2.7 ml. of 1.0 molar triethyaluminum solution which had been diluted to 5 ml. with benzene. A fine black precipitate formed which slowly settled.

The catalyst slurry was added to an autolave containing 33.8 g. of 1,3-pentadiene and 233 g. cyclohexane. The autoclave was purged and pressured with hydrogen to 500 p.s.i.g., and the contents were stirred for 1 hour at room temperature and then sampled.

Then the autoclave was heated slowly. At about 210° F. the reaction became rapid, the hydrogen pressure falling and the temperature increasing rapidly. The mixture was again sampled. The results of the analyses of these samples are shown in Table 4 below.

TABLE IV.—HYDROGENATION OF 1,3-PENTADIENE

| Composition[1] | After 1 hour at room temperature | Heated to 210° F. |
| --- | --- | --- |
| Isopentane | 0.00 | t |
| n-Pentane | 1.44 | 5.68 |
| Pentene-1 | 5.50 | 0.0 |
| t-Pentene-2 | 5.07 | 33.8 |
| c-Pentene-2 | 1.91 | 9.4 |
| t-1,3-pentadiene | 51.70 | 5 |
| c-1,3-pentadiene | 34.55 | 5 |

[1] By gas-liquid chromatography, in area percent.

The data in the Table IV above show that, under these conditions and in the absence of a catalyst modifier such as CO, the 1,3-pentadiene was essentially completely hydrogenated to pentenes and pentanes.

The above examples and tables fully demonstrate the effectiveness of the catalytic method of our invention for hydrotreating unsaturated hydrocarbon feedstreams and the method for preparing said catalyst. Reasonable variation and modifications are possible within the scope of this disclosure without departing from the spirit and scope of the invention.

What we claim is:

1. A method of treating a diolefinic feedstream containing acetylenic compounds to selectively hydrogenate said acetylenic compounds comprising:

contacting said feedstream under hydrogenation conditions of
a temperature of 150–400° F., a pressure of 0–2000 p.s.i.g. and sufficient to maintain said feedstream in liquid phase, and with 0.1 to 5 moles of hydrogen per mole of olefin;

in a hydrotreating zone with from about 0.1 millimole to about 1 mole of iron per mole of olefin feed wherein the iron results from an iron-containing catalyst formed by admixing a ferric halide and an ether in the presence of a solvent, and reducing the resulting ferric halide etherate solution with an organoaluminum compound having the formula $R_nAlX_{3-n}$ wherein R is an alkyl radical having from 1 to 12 carbon atoms per radical, $n$ is an integer of from 1 through 3, and X is fluorine, chlorine, or bromine, the atomic ratio of aluminum to iron being in the range of 1:1 to 10:1;

there further being added to said hydrotreating zone 0.02 to 1 mole percent of CO based on the moles of hydrogen.

2. A method according to claim 1 wherein said ferric halide is ferric chloride and said ether is selected from the group consisting of diethyl ether, methylethyl ether, isopropyl ether, dimethyl ether, tetrahydrofuran, dibutyl carbitol, and 2,2'-dichlorodiethyl ether and said solvent is selected from the group consisting of aromatic and paraffinic hydrocarbons.

3. A method according to claim 2 wherein said feed stream comprising acetylenic compounds is a refinery $C_4$ butadiene concentrate.

4. A method according to claim 1 wherein said catalyst is separated and recycled to said hydrotreating zone.

References Cited

UNITED STATES PATENTS

| | | | |
| --- | --- | --- | --- |
| 3,136,621 | 6/1964 | Pearson | 252—429 A |
| 3,259,611 | 7/1966 | Hornbaker et al. | 260—86.3 |
| 3,412,174 | 11/1968 | Kroll | 260—683.9 |

DANIEL E. WYMAN, Primary Examiner

A. P. DEMERS, Assistant Examiner

U.S. Cl. X.R.

252—429; 260—683.9, 677 H